United States Patent [19]
Pottorff

[11] Patent Number: 6,113,026
[45] Date of Patent: *Sep. 5, 2000

[54] BOW SPREADER BAR

[75] Inventor: Earl T. Pottorff, Savannah, N.Y.

[73] Assignee: Pearl Technologies, Inc., Savannah, N.Y.

[ * ] Notice: This patent issued on a continued prosecution application filed under 37 CFR 1.53(d), and is subject to the twenty year patent term provisions of 35 U.S.C. 154(a)(2).

[21] Appl. No.: 09/192,343

[22] Filed: Nov. 16, 1998

[51] Int. Cl.$^7$ .............................. B65H 23/04; B65H 23/00
[52] U.S. Cl. ....................... 242/615.4; 242/548; 242/566; 242/909; 226/196.1
[58] Field of Search ............................... 242/615, 615.21, 242/615.4, 548, 566, 909; 226/196.1

[56] References Cited

U.S. PATENT DOCUMENTS

| | | | |
|---|---|---|---|
| 3,463,377 | 8/1969 | Lucas | 242/615 |
| 5,585,120 | 12/1996 | Pottorff | 425/72.1 |
| 5,700,489 | 12/1997 | Pottorff | 425/72.1 |

*Primary Examiner*—John Q. Nguyen
*Attorney, Agent, or Firm*—Trapani & Molldrem

[57] ABSTRACT

A bow spreader bar employed in a plastic film processing arrangement incorporates an extruded member and a low-friction plastic wear cover. The bow spreader bar is positioned in advance of the film take-up roll and presses into the film web to eliminate folds, wrinkles, or creases. The extrusion can be of aluminum or another light-weight material having a T-shaped profile that is rounded on a side that faces the film so that the extrusion has an arcuate front surface. The associated wear cover is made of a wear resistant plastic material and is disposed on the arcuate surface of said extrusion. Preferably, the extrusion is formed with one or more tubular portions and can be fitted for fluid cooling. The arcuate surface of the extrusion can be provided with a low-friction surface treatment.

14 Claims, 2 Drawing Sheets

BOW SPREADER BAR

BACKGROUND OF THE INVENTION

The present invention relates to the processing of plastic film and to the fabrication of articles made of plastic film. The invention is more specifically directed to a bow spreader bar for stretching the web of film transversely as it passes between a supply roll and a pick-up roll so as to eliminate creases and wrinkles in the film. The invention is more particularly concerned with improvements to the bow spreader which increase its useful life and reduce maintenance problems experienced with current or prior-art bow spreaders, and which eliminate problems of catching or tearing of the film.

Polyethylene film or films of other plastic materials are typically produced as elongated webs of film and are stored as rolls of film for further processing. The film can be fed from a supply roll through one or more processing stages and then taken up on another roll. This processing can include printing, die cutting, punching, seam forming, etc., as appropriate for an end product, such as plastic bags of various types. In a typical operation, there is a stress imposed on the web in the long direction of the web, also known as the "machine direction" or "MD" with relatively little stress in the transverse direction or "TD." As a result, the plastic film can become creased or wrinkled prior to being rewound on the take-up roll. These creases can interfere with subsequent printing, punching, or cutting steps, and can decrease the value of the end product. Consequently it has become the practice to impose a transverse stress on the web by means of a bow or arm.

Typically, a bow spreader is positioned adjacent to the plane of the web in advance of the take-up roll. The bow spreader is arced so as to press into the web, and is usually arranged to be perpendicular to the plane of the web. The conventional bow spreader is normally formed of a curved rod carrying a row of rollers, and with a rubber covering over the rollers. The intention is that the rollers and covering rotate about the rod as the plastic film moves past. In order to turn the existing bow rollers, the bow has to press heavily into the film web, and create significant web tension. Alternatively, the rollers may be power driven to match the line speed. In that case the powered bow bar requires a speed sensor and a feedback circuit so that the rollers match the line speed exactly. This also increases the cost and complexity of the device. Because of the rotating movement of the rollers, internal wear takes place, and because of the curved axis from one roller to the next, there is a gap that tends to pinch the covering and can also catch on the web of film that the bow bar is in contact with. Also, because of the complexity of design and the number of moving parts, the conventional, roller-based bow spreaders are quite expensive, and also require considerable maintenance.

OBJECTS AND SUMMARY OF THE INVENTION

Accordingly, it is an object of this invention to provide a bow spreader bar that eliminates wrinkles and creases and yet avoids the drawbacks of the prior art.

It is another object of the invention to provide a bow spreader bar without rollers or rotating parts that can wear out or pinch the plastic film web.

It is a further object to provide a bow spreader that is less costly to purchase and maintain than prior-art spreaders.

It is a still further object to provide a bow spreader bar that incorporates cooling means to carry away heat from the web of plastic film.

According to an aspect of the present invention, a plastic film processing arrangement is provided with an non-rotational bow spreader bar of a simple, improved design. In the film processing arrangement, a web of plastic film is unrolled from a supply roll, processed in a processing stage, and then re-rolled onto a take-up roll. At least one bow spreader arm is disposed transversely in contact with film in advance of the take-up roll. The improved bow spreader bar, which slidably and non-rotationally contacts the moving web of film, has a film-facing surface formed of a low-friction material. The surface of low-friction material can be carried out by using a friction-reducing surface treatment on the film-facing surface, or can be carried out using a snap-on plastic wear plate. The spreader bar can favorably take the form of an extruded arcuate member adapted to be positioned transversely in contact with the plastic film web in advance of the take-up roll, with the extruded member having a profile that defines a rounded surface facing the web. A support member holds the extruded arcuate member in contact with the web, and the low-friction material is situated on the rounded surface of the extruded member. This can either be a removable and replaceable plastic wear piece, or can be a low-friction surface treatment.

The extruded member can be an aluminum extrusion having a somewhat T-shaped profile, with the cap or cross-arm member of the tee being bowed, and the stem having a tubular portion adjacent the cap that can carry cooling fluid, e.g., water. Couplings can be fitted into the ends of the extrusion to connect with the rest of the water cooling system. In the case of a removable plastic wear piece, the same can have the same general profile as the cap of the T-shaped extruded member, and can be formed of a suitable semi-rigid plastic, such as Delrin, which can incorporate a lubricating filler. In the case of a surface treatment of the top or cross-bar member of the T-profile extrusion, good performance has been observed using a surface treatment SM-24, sold by Luke Engineering of Wadsworth, Ohio. This is a lubrication hard coating impregnated into the aluminum of the extrusion.

The above and many other objects, features, and advantages of this invention will become apparent from the ensuing description of an exemplary embodiment, which should be read in conjunction with the accompanying Drawing.

DETAILED DESCRIPTION OF THE PREFERRED EMBODIMENTS

Figure 1:
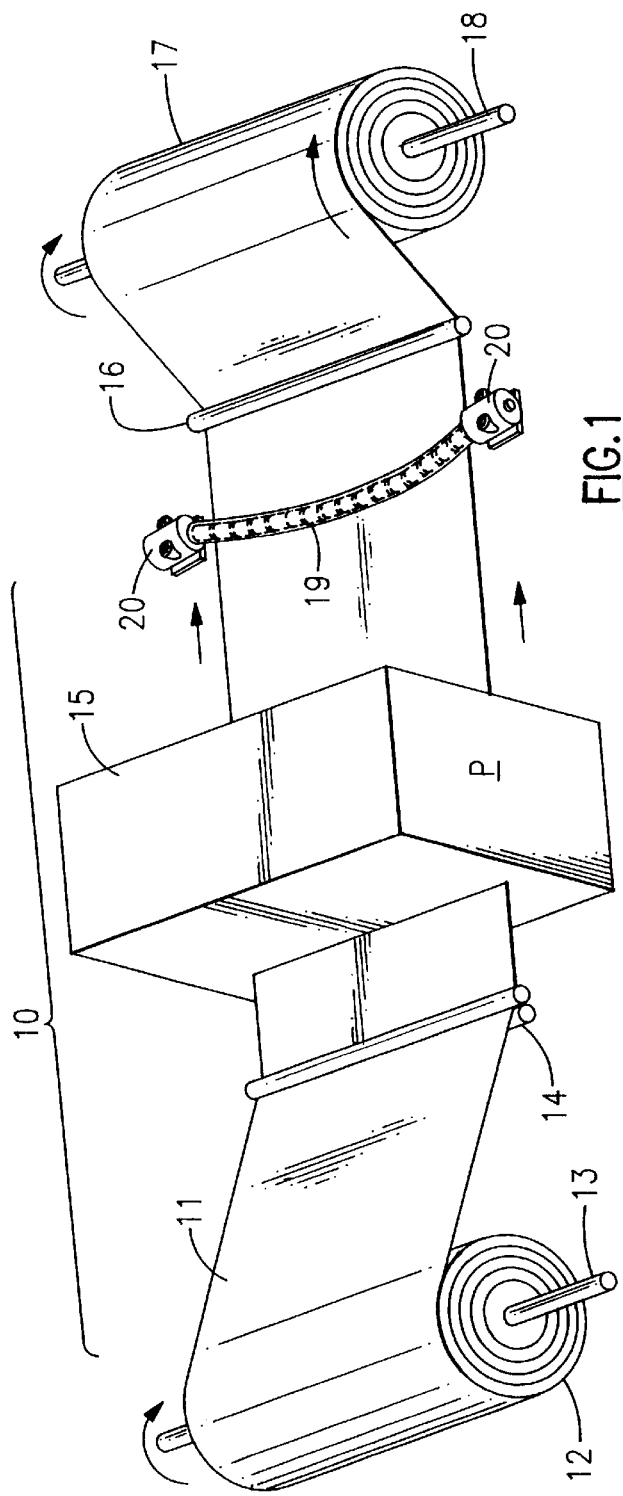
FIG. 1 is perspective view of a plastic film processing arrangement, employing a roller-type bow spreader of the prior art.

With reference to the Drawing, FIG. 1 illustrates a film processing assembly 10 for processing cold plastic film, and which includes a bow spreader according to the prior art.

Film 11 is unwound from a supply roll 12, here supported on a mandrel 13, and travels past guide rollers 14 to a printer 15 which can print or emboss the plastic film 11. The printer 11 is shown generically and stands for any of a variety of processing equipment which are known and used in the plastic film industry. The film 11 that proceeds out of the printer 15 passes another set of guide rollers 16 and is re-wound on a take-up roll 17, here supported on a mandrel. The arrows in FIG. 1 generally show the direction of film travel. Because a stress is applied in the travel direction, the processing here can result in longitudinal folds and creases in the web of film, which can spoil portions the plastic film for some plastic film products. In order to induce a transverse stress and eliminate creases, folds, and wrinkles, a bow spreader 19 is positioned along the film web in advance of the take-up roll 17. Because the moving web of plastic film has a relatively high coefficient of friction, the prior-art bow spreader is generally configured as to revolve as the film passes over it, and has the construction shown in FIG. 2. The bow spreader is supported here on a transverse mounting bar 20.

Figure 2:
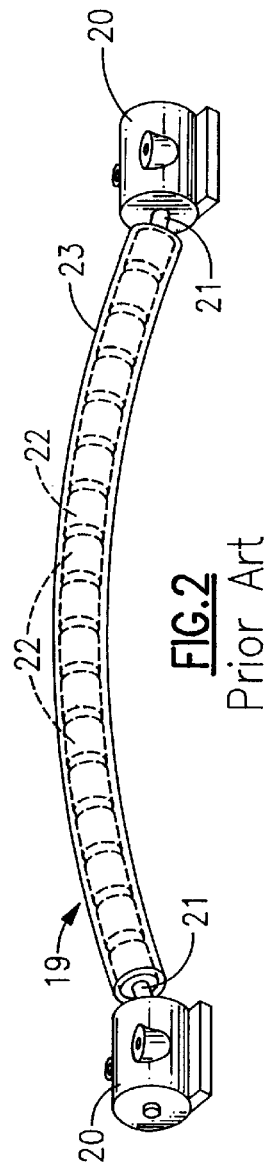
FIG. 2 is an enlarged view of the prior-art bow spreader of FIG. 1.

As seen in FIG. 2, the prior-art bow spreader 19 has an arcuate metal rod 21 serving as a core, and there is a row of rollers 22 positioned along the rod. A sheath of plastic or rubber covers the rollers 22, and rotates or revolves as the film 11 is drawn over it. In some versions, the rollers 22 have separate rubber or plastic coatings, rather than employing the sheath.

The prior art approach does have some problems. The rollers 22 can wear out over time, and can snag or catch on the curved core rod 21. Also, because the row of rollers 22 is curved, the rollers touch one another at the inside part of the curve, while there are gaps between rollers at the outside part of the curve, i.e., the side facing the film. The gaps can catch and pinch the film, or catch and pinch the sleeve 23 after the rollers become worn. Also, it is not possible to support the bow spreader 19 at the middle of the arc, as that would interfere with its rotation function. Because of the number of parts, the prior-art bow spreader 19 is expensive both in terms of initial purchase and in terms of maintenance. When any of the rollers 22 or the sheath 23 becomes worn, the entire bar 19 has to be removed and taken out of service to replace the worn parts. This service can often be accomplished only at the factory. It was an intention of this invention to resolve the difficulties of this arrangement, and also to make the bow spreader bar simpler and easier to maintain.

Figure 3:
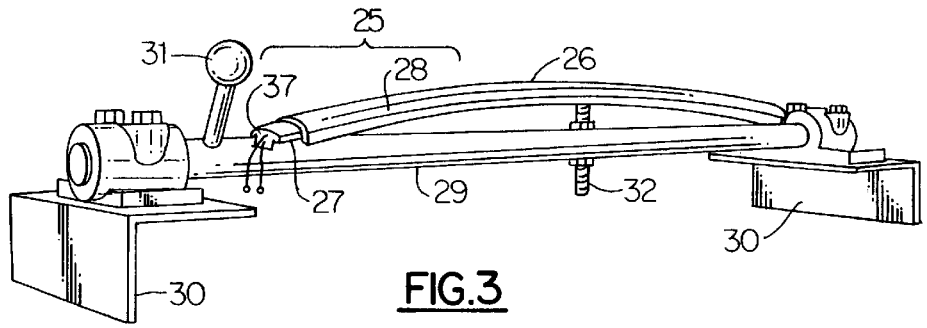
FIG. 3 is a perspective view of a bow spreader bar according to an embodiment of this invention.

A bow spreader bar assembly 25 according to an embodiment of this invention is shown in FIG. 3. The bow spreader bar is non-rotating, and presents a low-friction surface to the film web that travels past it. An arcuate bow spreader bar 26 is formed of a base formed as a continuous aluminum extrusion 27 and a low friction wear cover or cap 28. The extrusion 27 and cover 28 are shown in more detail in FIGS. 4 and 5. The bar 26 is mounted on a transverse support member 29, which can be in the form of a tube or beam, with corner mounts 30 that mount onto a frame of the processing assembly. An adjustment lever 31 adjusts the pressure or squeeze at the ends of the extrusion 27 to increase or decrease the amount of curvature, and also adjusts the position of the bow spreader bar 26 relative to the plane of the film web. An adjustment screw 32 passes through the support member 29 and into the back side of the extrusion 27. This supports the bow spreader bar 26 at its center, and can adjust the amount of curvature of the bow and the depth of penetration of the bow spreader bar into the plane of the film.

Figure 4:
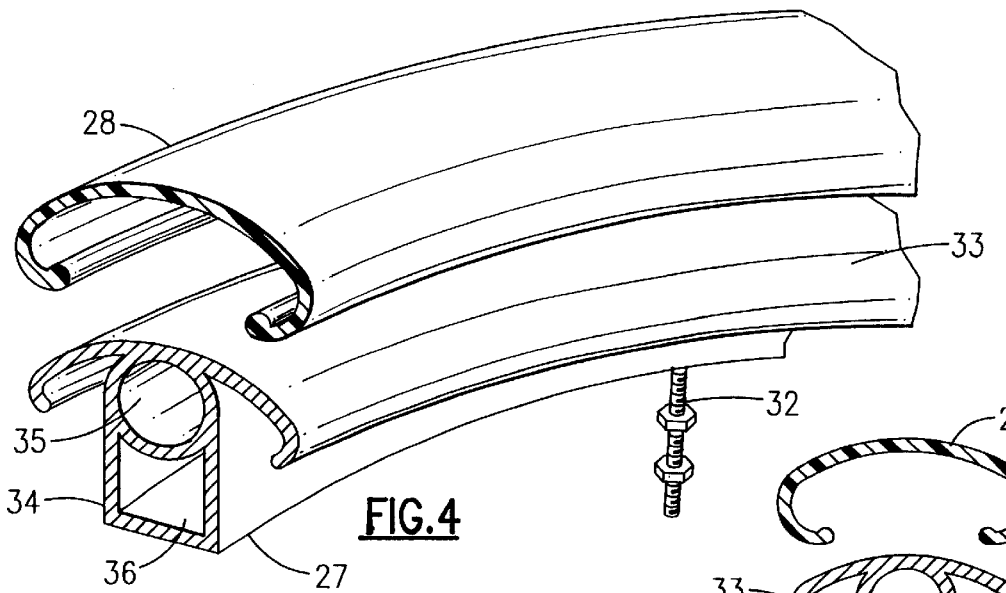
FIG. 4 is a perspective assembly view of the extruded member and wear cap of the embodiment of FIG. 3.
Figure 5:
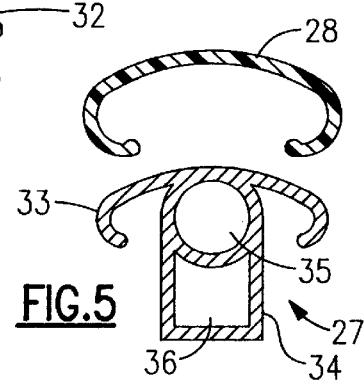
FIG. 5 is a cross section taken at 5—5 of FIG. 4.

As shown in FIGS. 4 and 5, the extrusion 27 can be an elongated aluminum member having a generally T-shaped profile, with a top portion 33, or cross-bar of the tee, having an arcuate cross section. A lower portion 34, or upright member of the tee, has a round tubular portion 35 adjacent to the top portion 33 and formed into it, and a square tubular portion 36 directly beneath the round tubular portion 35. The square portion 36 can be used to secure the bow spreader arm 26 to other members. In some embodiments, a liquid coolant, e.g., water, can flow through the round tubular portion 33, and then return through the square portion behind it. A suitable water fitting 37 (FIG. 3) can be provided to couple to hoses and tubes of a coolant supply (not shown).

The cover or cap 28 has a profile similar to that of the arcuate upper portion 33, and is adapted to snap in place onto the arcuate portion 33 of the extrusion 27. The cover 28 can be extruded or molded of a low-friction, semi-rigid plastic material, one example of which is Delrin filled with a lubricant filler. Several examples of suitable materials are discussed in my earlier U.S. Pat. Nos. 5,700,489 and 5,585,120. When the cover 28 becomes worn, it can be removed and replaced quickly, as it snaps off and the replacement cover can be snapped into place. The replacement operation takes only a few minutes.

Figure 6:
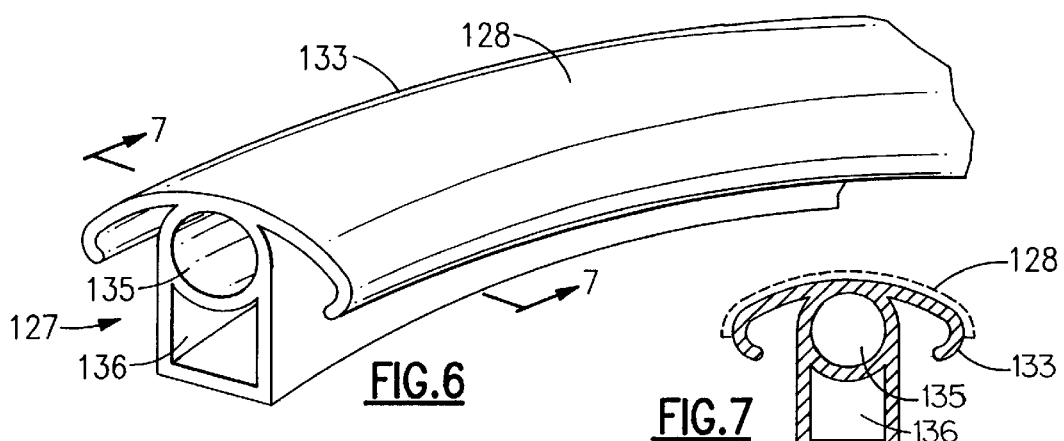
FIG. 6 is a perspective view of an extruded bow spreader bar according to an alternative embodiment.
Figure 7:
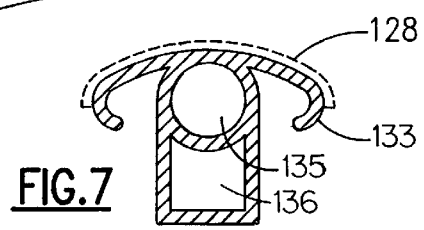
FIG. 7 is a cross section taken at 7—7 of FIG. 6.

A second embodiment of this invention is described with reference to FIGS. 6 and 7. Here, the structure is generally similar to that of the first embodiment, and elements that correspond to similar elements in the first embodiment bear similar reference numbers, but raised by 100. In this embodiment, the aluminum extrusion 127 has a generally T-shaped profile, with a curved top portion 133 and a lower portion 134 that includes a round tubular member 135 and a square tubular member 136. A low-friction surface treatment 128 is incorporated into the film-facing surface of the upper member 133. Many suitable low-friction treatments are known, including hard coats, ceramic impregnations, and other similar techniques. A surface treatment that has been found to be highly suited for this is known as SM-24, available from Luke Engineering of Wadsworth, Ohio.

The low friction wear cover 28 can be used whether the extrusions are provided with the low-friction surface treatment 128 or without it. Also, the extrusion 127 can be provided both with the surface treatment 128 and the plastic wear cover 28. Different plastic films have different coefficients of friction, and so whether the wear cover is used can depend on the materials used in the plastic film.

While this invention has been described in detail with reference to selected preferred embodiments, it should be recognized that the invention is not limited to those embodiments. Rather, many modifications and variations will present themselves to persons skilled in the art without departing from the scope and spirit of the invention, as defined in the appended claims.

I claim:

1. In film processing apparatus of the type in which a web is unrolled from a supply roll, processed in a processing stage, and then re-rolled onto a take-up roll; and at least one bow spreader is disposed transversely in contact with a web take-up roll; the improvement wherein said bow spreader slidably and non-rotationally contacts said web, and includes first and second tubular portions and an upper portion, said upper portion having a web-facing surface adapted to contact said web and formed of a solid low-friction material; and wherein said first tubular portion and said second tubular portion are disposed side-by-side directly below said upper portion said second tubular portion being directly beneath said first tubular portion; and means provide a fluid flow into and out of said first and second tubular portions, respectively.

2. The improvement of claim 1 wherein said low-friction material includes a snap-on plastic wear plate.

3. The improvement of claim 1 wherein said low-friction material includes a friction-reducing surface treatment on said web-facing surface.

4. The improvement of claim 1 wherein said bow spreader includes an extruded member.

5. Bow spreader bar arrangement for laterally stressing a web drawn past the arrangement, and which is unwound from a supply roll, processed in a processing stage, and then rewound on a take-up roll; the spreader bar arrangement comprising an extruded arcuate member adapted to be positioned transversely in contact with said web in advance of said take-up roll and having a profile that defines a rounded surface facing said web; a support member for holding said extruded arcuate member in contact with said web; and a solid low-friction material situated on said rounded surface of said extruded member; said extruded member having a generally T-shaped profile with a transverse curved upper member forming a cross-bar of said T-shaped profile; a first tubular member and a second tubular member extending side by side, with said first tubular member being directly beneath a bottom side of said transverse curved upper member; and said second tubular member adjacent and directly beneath said first tubular member.

6. The bow spreader bar assembly of claim 5 wherein said extruded arcuate member and said low friction material are disposed to be non-rotationally fixed as the web is drawn therepast.

7. The bow spreader bar assembly of claim 5 comprising means attached to said arcuate extruded member and to said support member for adjusting the amount of arc of the bow spreader bar.

8. The bow spreader bar assembly of claim 7 wherein said means for adjusting includes a threaded member centered on a back portion of said extruded member and on said support member.

9. The bow spreader bar assembly of claim 5 wherein said arcuate extruded member includes a continuous metal extrusion.

10. The bow spreader bar assembly of claim 5, wherein said first tubular member has a round cross section and said second tubular member has a square cross section.

11. The bow spreader bar assembly of claim 5 wherein said low-friction material is in the form of a plastic wear plate adapted to fit removably over said transverse curved upper member.

12. The bow spreader bar assembly of claim 5 wherein said low friction material includes a low-friction surface treatment applied to the transverse curved upper member of said continuous metal extrusion.

13. The bow spreader bar assembly of claim 5 wherein said tubular lower member is fitted with fluid connector means adapted to effect a flow of a fluid cooling medium through said tubular members.

14. The bow spreader bar assembly of claim 5, wherein said curved upper member has a generally C-shaped cross section.

* * * * *